(12) United States Patent
Napoli et al.

(10) Patent No.: US 7,508,444 B1
(45) Date of Patent: Mar. 24, 2009

(54) ELECTRONIC CAMERA WITH QUICK VIEW AND QUICK ERASE FEATURES

(75) Inventors: Thomas A. Napoli, Webster, NY (US); Masaki Izumi, Yokohama (JP); Kyoichi Omata, Tanashi (JP); Carolyn A. Bussi, Rochester, NY (US); Clay A. Dunsmore, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/012,144

(22) Filed: Jan. 22, 1998

(51) Int. Cl.
*H04N 5/225* (2006.01)
*H04N 5/222* (2006.01)

(52) U.S. Cl. .............. 348/372; 348/333.01; 348/333.13

(58) Field of Classification Search .................. 348/333, 348/334, 231, 222, 372, 333.11, 333.12, 348/333.13
See application file for complete search history.

(56) References Cited

U.S. PATENT DOCUMENTS

| | | | |
|---|---|---|---|
| 4,456,931 A | 6/1984 | Toyoda et al. | 358/335 |
| 4,571,627 A | 2/1986 | Stempeck | 358/224 |
| 4,714,962 A | 12/1987 | Levine | 358/209 |
| 4,742,369 A | 5/1988 | Ishii et al. | 354/441 |
| 4,827,347 A | 5/1989 | Bell | 358/224 |
| 4,903,056 A | 2/1990 | Kamikubota et al. | 354/76 |
| 4,928,137 A * | 5/1990 | Kinoshita | 348/372 |
| 4,949,117 A | 8/1990 | Van Heyningen et al. | 354/412 |
| 5,023,650 A | 6/1991 | Hoshino et al. | 354/441 |
| 5,164,831 A | 11/1992 | Kuchta et al. | 358/209 |
| 5,541,656 A | 7/1996 | Kare et al. | 348/334 |
| 5,561,462 A * | 10/1996 | Nagano | 348/372 |
| 5,619,257 A * | 4/1997 | Reele et al. | 348/64 |
| 5,845,166 A * | 12/1998 | Fellegara et al. | 348/64 |
| 6,188,432 B1 * | 2/2001 | Ejima | 348/240.99 |
| 7,092,024 B2 * | 8/2006 | Kawamura et al. | 348/333.12 |

OTHER PUBLICATIONS

U.S. Appl. No. 08/803,342, filed Feb. 20, 1997, Peter Fellegara et al.
U.S. Appl. No. 08/949,845, filed Oct. 14, 1997, Hideki Akiyama et al.

* cited by examiner

*Primary Examiner*—David L Ometz
*Assistant Examiner*—Luong T Nguyen
(74) *Attorney, Agent, or Firm*—David M. Woods

(57) ABSTRACT

An electronic camera includes a sensor for capturing an image, an electronic image display for displaying the captured image, and a user interface for selectively enabling a quick view feature in which the image display is automatically turned on for a set period of time after an image is captured, and then automatically turned off, in order to quickly review the captured image. The camera further includes a processor for performing processing on the captured image and generating a processed image file therefrom, and a memory for storing the processed image file. When an erase command is provided to the processor, the processing of the image file is terminated and the partially completed image file is deleted from the second memory.

2 Claims, 5 Drawing Sheets

ELECTRONIC CAMERA WITH QUICK VIEW AND QUICK ERASE FEATURES

FIELD OF THE INVENTION

The invention relates generally to the field of electronic photography, and in particular to digital cameras having an image display and review capability.

BACKGROUND OF THE INVENTION

Some electronic cameras in the prior art use an electronic image display, such as a liquid crystal display (LCD), for image review both before and after capture. In these cameras, the LCD display is powered on prior to image capture, since the LCD is used to review the image prior to capture. For example, in the electronic camera described in U.S. Pat. No. 4,456,931, initial depression of the shutter release causes a motion image to be displayed on a monitor on the camera. Further depression of the shutter release causes a still image to be captured from the motion sequence, stored in a buffer memory, and displayed on the monitor. Complete depression of the shutter release causes the transfer of the still image in the buffer memory to a separate output memory system. In prior art cameras of this type, considerable power is dissipated in sustained operation of the image display for image review prior to capture.

Some digital cameras rely on an optical viewfinder for composing images and an image display, such as an LCD display, for viewing captured still images. For instance, in Ser. No. 08/803,342, entitled "Electronic Camera with Quick Review of Last Captured Image", filed Feb. 20, 1997 in the name of the same assignee as the present application, an electronic camera has a working memory for storing a working image corresponding to the last captured image and a non-volatile memory, such as internal flash memory or a removable memory card. When an image is captured, the image data is stored in the working memory, and the image data is also immediately processed for storage in the non-volatile memory. The working image is displayed on a display screen in a quick review mode of operation in response to user actuation of a quick review switch. The display screen is thus kept in an inactive state until the quick review is requested, and returns to an inactive state after a predetermined time period or when the quick review switch is again activated. In this manner, energy to drive the display screen may be conserved.

In the Kodak DC25 camera, which includes an optical viewfinder and a color LCD display, a still image is read from its sensor and temporarily stored in a buffer memory. The image is then read from the buffer, processed, and stored on a removable memory card, which altogether typically takes 5 to 10 seconds. Since the color LCD requires a backlight in order to provide a bright image, it draws a substantial amount of power when it is turned on. To allow reduced battery drain, the DC25 camera includes a display switch so the user can manually turn the display on and off. In order to immediately view images captured by the DC25 camera, the user must first push the display switch to turn on the display before capturing an image. Therefore, the LCD display is powered even during the time the user is looking through the optical viewfinder to compose an image. Once the user presses a shutter button and takes an image, a low resolution version of the image from the buffer memory is immediately displayed on the LCD display. At the same time a high resolution version is being processed and stored in the removable memory card.

In order to reduce memory space, the DC25 camera includes an erase button that can be used to delete one or more images from the removable memory. If the displayed image is unacceptable, the user typically wants to immediately erase the unacceptable image and take a new picture of the same scene. With the DC25 camera, however, the user must wait until the high resolution processing is completed, which takes 5 to 10 seconds. Therefore, the user is not able to immediately take a new image, but must instead wait until the processing of the undesired image is completed. As a result, the camera wastes battery power by creating and storing an image file that will be immediately deleted. Moreover, the picture opportunity may be lost due to the interim wait.

In the type of camera that relies on an optical viewfinder for image composition, what is needed is an LCD based camera design that enables users to quickly view and (when desired) immediately erase newly taken images, while minimizing the camera battery drain by powering the LCD only when necessary to review an image.

SUMMARY OF THE INVENTION

The present invention is directed to overcoming one or more of the problems set forth above. Briefly summarized, according to one aspect of the present invention, an electronic camera includes a sensor for capturing an image, an electronic image display for displaying the captured image, and a quick view feature in which the image display is automatically turned on for a period of time after an image is captured, and then automatically turned off. The quick view feature is embodied in a control section responsive to the quick view feature for powering up the image display after the image is captured by the sensor in order to display the captured image, and then automatically turning off the image display after the period has elapsed.

In a further embodiment, the camera includes a first buffer memory for storing the captured image, a processor for performing image processing on the captured image over a period of time and generating a processed image file therefrom, and a second memory for storing the processed image file. The user interface further provides an erase command to the processor, which responds to the erase command by terminating the processing of the image file and deleting the partially completed image file from the second memory.

Typically, the image is read from the buffer, processed, and stored on a removable memory card, which typically takes 5 to 10 seconds. The advantage of the invention lies in the "quick view" feature, which reduces battery drain. When this feature is enabled, the LCD display is turned on immediately after each picture is taken, typically for about 3 seconds, and then turned off. This allows the user to verify that an acceptable image was taken. If so, the user waits until the processing is completed, and can then take the next image. The LCD display remains "off" most of the time to reduce battery drain, without requiring the user to manually turn it on and off. When displaying a newly taken image, the LCD display includes an "erase" icon. If a user does not want to keep a new image, a delete key is pressed. This immediately stops the current image from being processed. Therefore, a new image can be taken immediately, rather than waiting for the processing to be completed.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because digital cameras employing electronic sensors and electronic processing and storage are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts.

Figure 1:
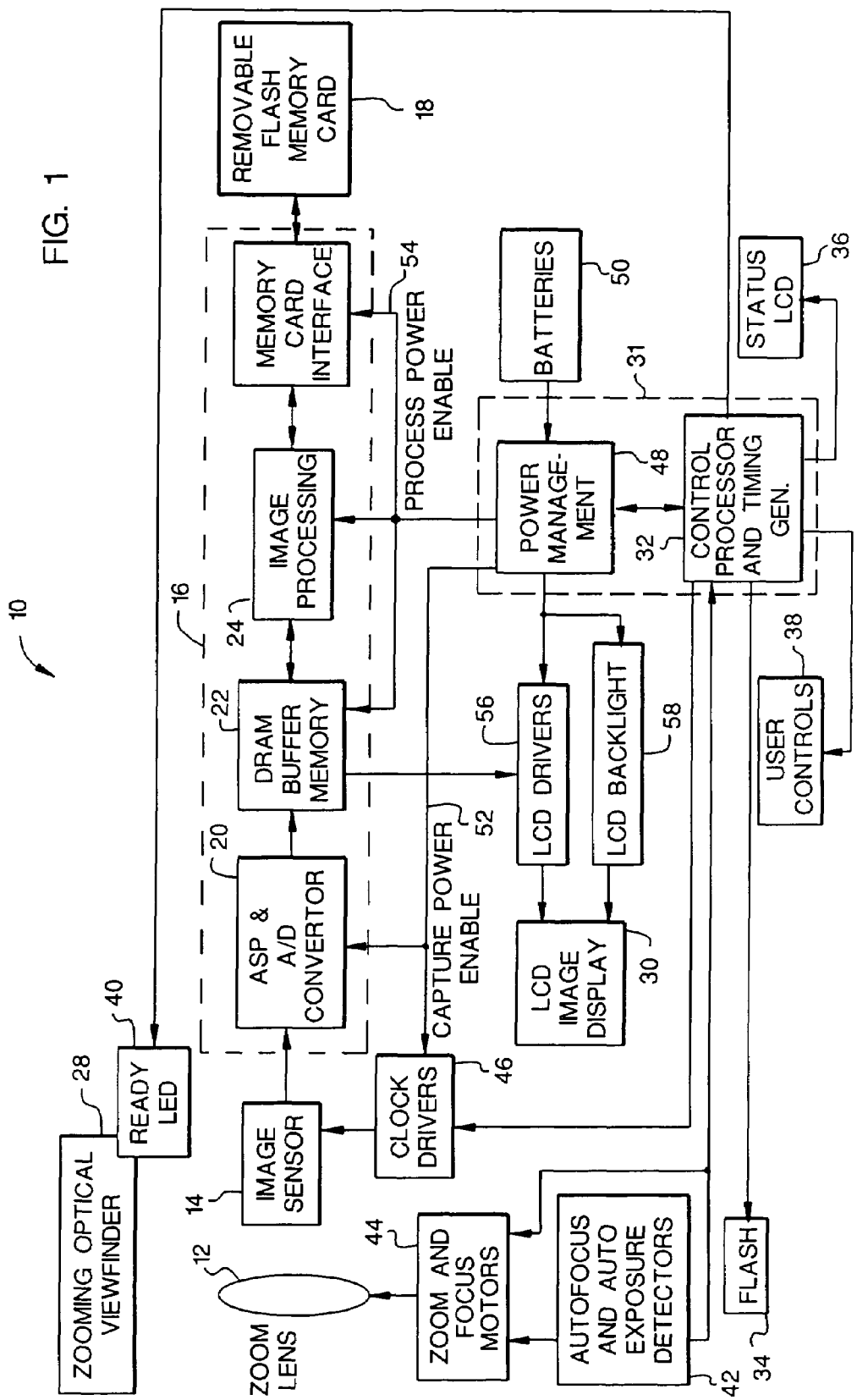
FIG. 1 is a block diagram of a digital camera including a quick review and quick erase feature according to the invention.

Referring first to FIG. 1, a digital camera 10 includes a zoom lens section 12 for directing image light toward an image sensor 14, a processing section 16, and a removable output memory 18, such as a flash memory card. The image sensor 14 is typically a color sensor, and includes a color filter array, such as the well-known Bayer pattern (see U.S. Pat. No. 3,971,065). The processing section 16 includes an analog signal processing A/D converter 20, a DRAM buffer memory 22, an image processing block 24 (which may be a programmable DSP capable processor, such as a Hitachi SH-DSP processor), and an output interface 26 to the removable memory 18. The output interface 26 is a memory card interface adapted to a conventional card interface standard, such as the PCMCIA card interface standard, such as described in the *PC Card Standard*, published by The Personal Computer Memory Card International Association, Sunnyvale, Calif., March 1997. The removable memory 18 accordingly is a non-volatile PCMCIA memory card containing either solid state memory, such as Flash EPROM memory, or a small hard drive (categorized as a PCMCIA-ATA Type III Hard Drive under the PCMCIA card interface standard). Another card interface standard is the CompactFlash ATA with DOS file format. Alternatively, other non-volatile storage devices may be used, such as a floppy disk magnetic medium or optical storage (in such cases, a suitable interface and a conventional read/write apparatus would be provided in the camera 10, e.g., a magnetic or optical read/write head).

The DRAM buffer memory 22 has sufficient memory space for at least one full resolution image captured by the image sensor 14. The camera 10 also includes a zooming optical viewfinder 28, an image liquid crystal display (LCD) 30, a control section 31 including a control processor and timing generator 32, a flash unit 34, a status LCD 36, and a user interface comprising a group of user controls 38. Nearby, or within, the optical viewfinder is a ready light 40 that is connected to the control processor and timing circuit 32. A set of autofocus and autoexposure detectors 42 provide data to the control processor and timing circuit 32 for driving zoom and focus motors 44 connected to the zoom lens 12, and for enabling clock drivers 46 in order to activate the image sensor 14.

The control section 31 further includes a power management controller 48, which is connected to the control processor and timing generator 32 for conserving power demands by the various components of the camera 10. Power supplied by batteries 50 is applied on demand to the clock drivers 46, the processing section 16, and the image LCD 30. More specifically, a capture power enable line 52 supplies power to the clock drivers 46 and the analog signal processing and A/D converter 20 and a separate process power enable line 54 supplies power to the DRAM buffer memory 22, the image processing block 24, and the memory card interface 26. The power management controller 48 also enables LCD drivers 56 to input data from the DRAM buffer memory 22 to the image LCD 30, and further enables an LCD backlight 58 to provide a variable amount of backlight to the image on the image LCD 30. In the preferred embodiment, the image LCD 30 is a color LCD for displaying color images.

Figure 2A:
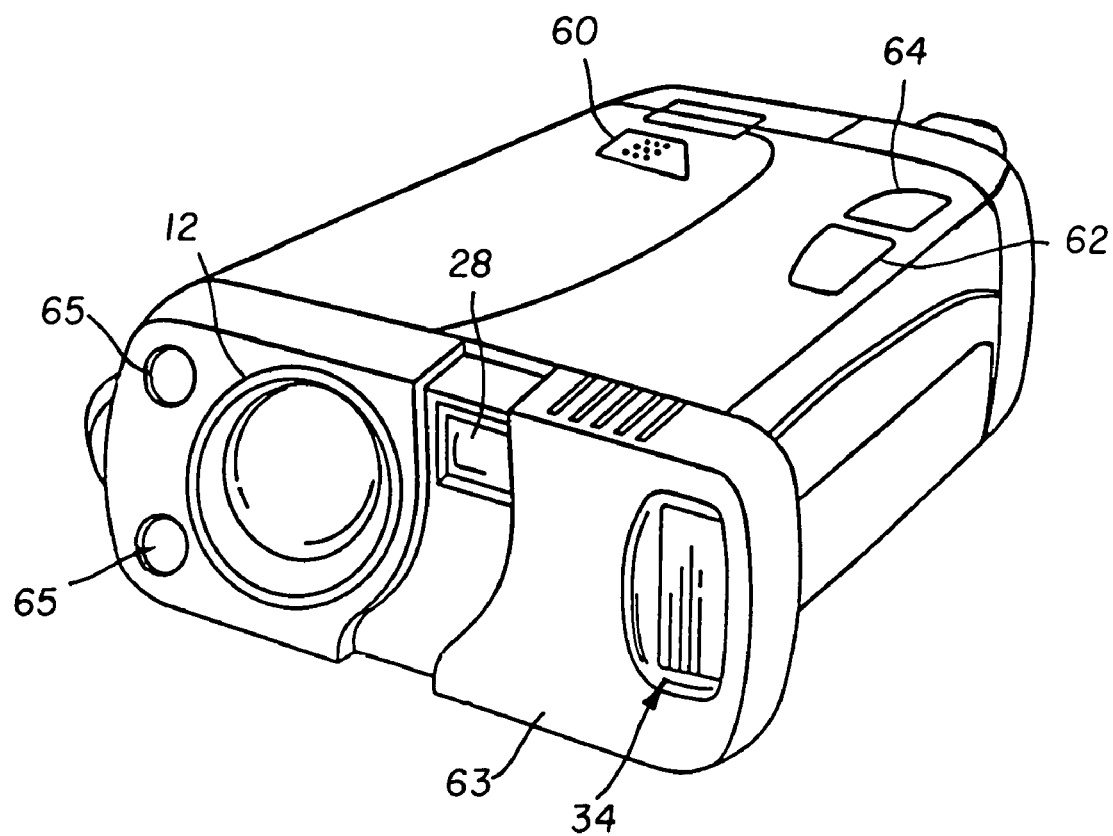
FIGS. 2A, 2B, 2C are views of the camera enclosure showing the user interface and other features accessible to a user of the camera shown in FIG. 1.
Figure 2B:
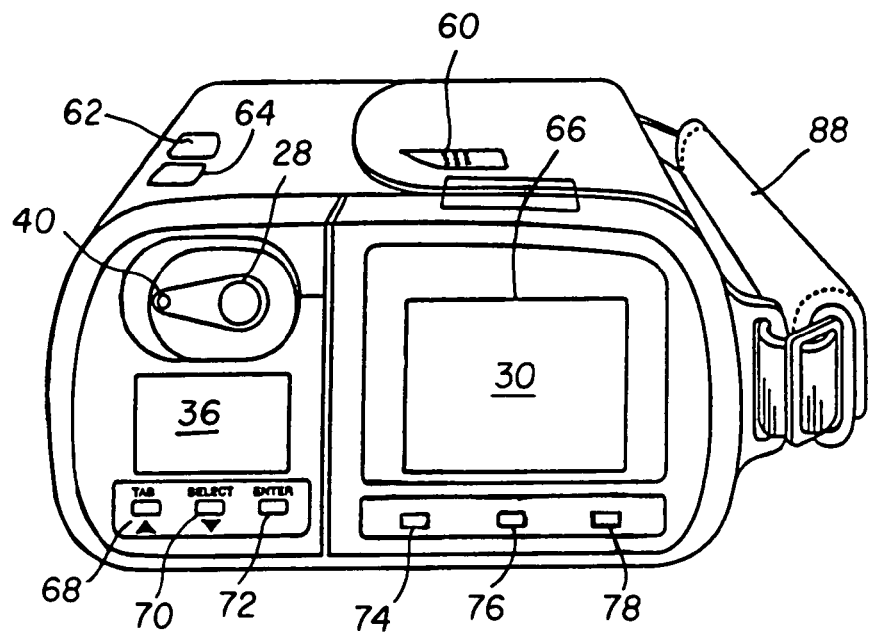
Figure 2C:
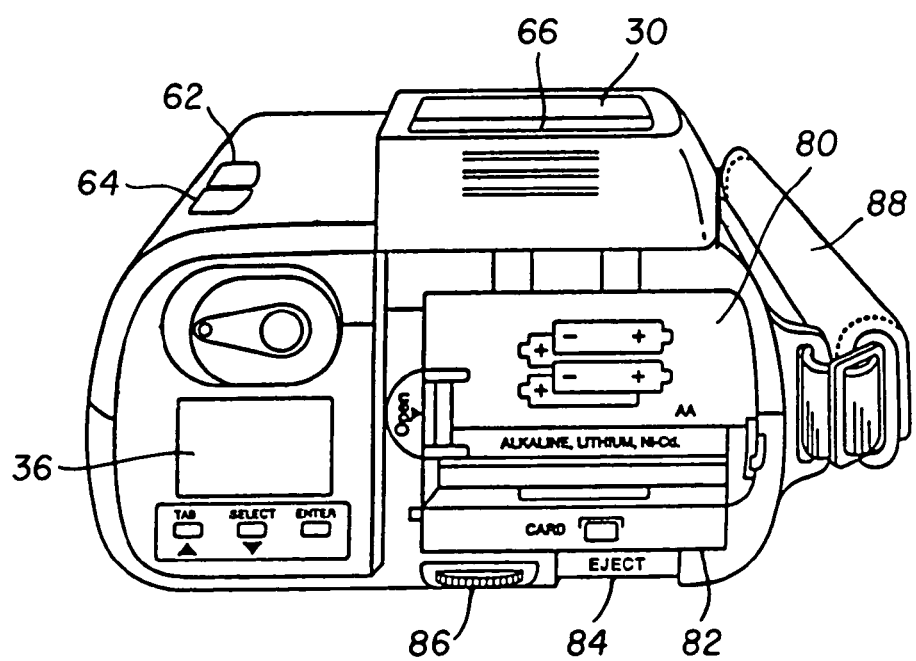

FIG. 2A shows a view of the camera 10 from the front, showing the aforementioned zoom lens section 12, the optical viewfinder 28, the flash unit 34, and certain of the user controls 38—including a shutter button 60, and telephoto and wide angle buttons 62, 64 for controlling the zoom lens section 12. The camera also includes a viewfinder cover 63 which is slid open (as shown in FIG. 2A) to power up the camera. FIG. 2A also shows a pair of autofocus sensors 65. The image LCD 30 is part of a flip up section 66 on the back of the camera 10. FIG. 2B shows the camera back with the flip up section "down", and FIG. 2C shows the camera back with the flip up section "up". The camera back includes the aforementioned image LCD 30, the status LCD 36, the back of the optical viewfinder 28, the ready light 40, and a further set of user controls 38—including a TAB button 68, a select button 70, and an enter button 72 for the status display 36; and a quick view switch 74, an erase button 76, and display button 78 for the image LCD 30. The status LCD 36 displays camera status information, such as the number of images that can still be stored, the flash setting (auto, off, fill), the battery level, and the compression level setting. The tab, select, and enter buttons 68, 70, 72 enable the user to modify these settings. When the flip-up screen 66 is "up", as shown in FIG. 2C, a cover 80 for the batteries 50 is revealed, as well as a card slot 82 for the removable memory 18, a card eject button 84, and an LCD brightness wheel 86 for controlling the LCD backlight 58. A handle 88 is further included on the side of the camera 10 for hand holding the camera.

Figure 3:
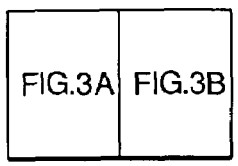
FIG. 3 is a flow diagram showing operation of the camera shown in FIG. 1 according to the invention.
Figure 3A:
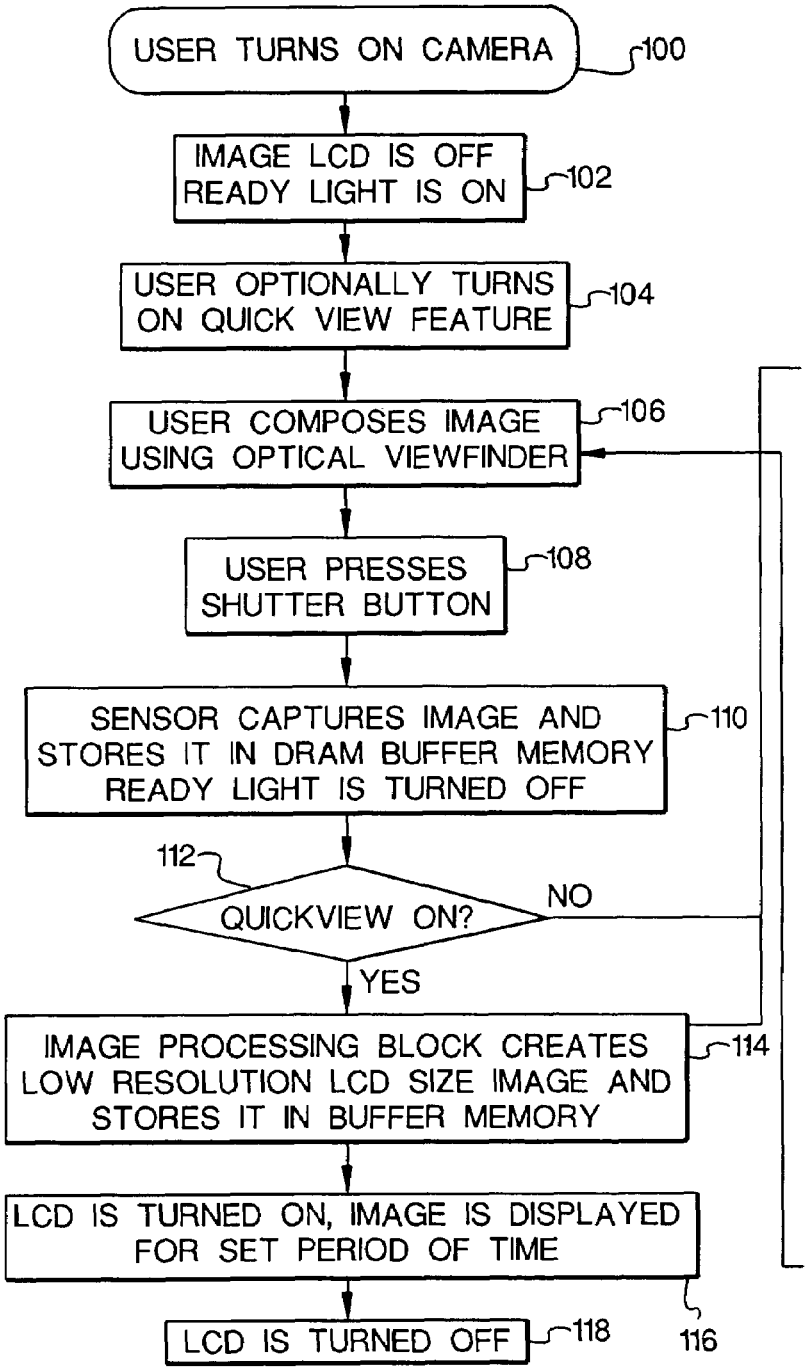
Figure 3B:
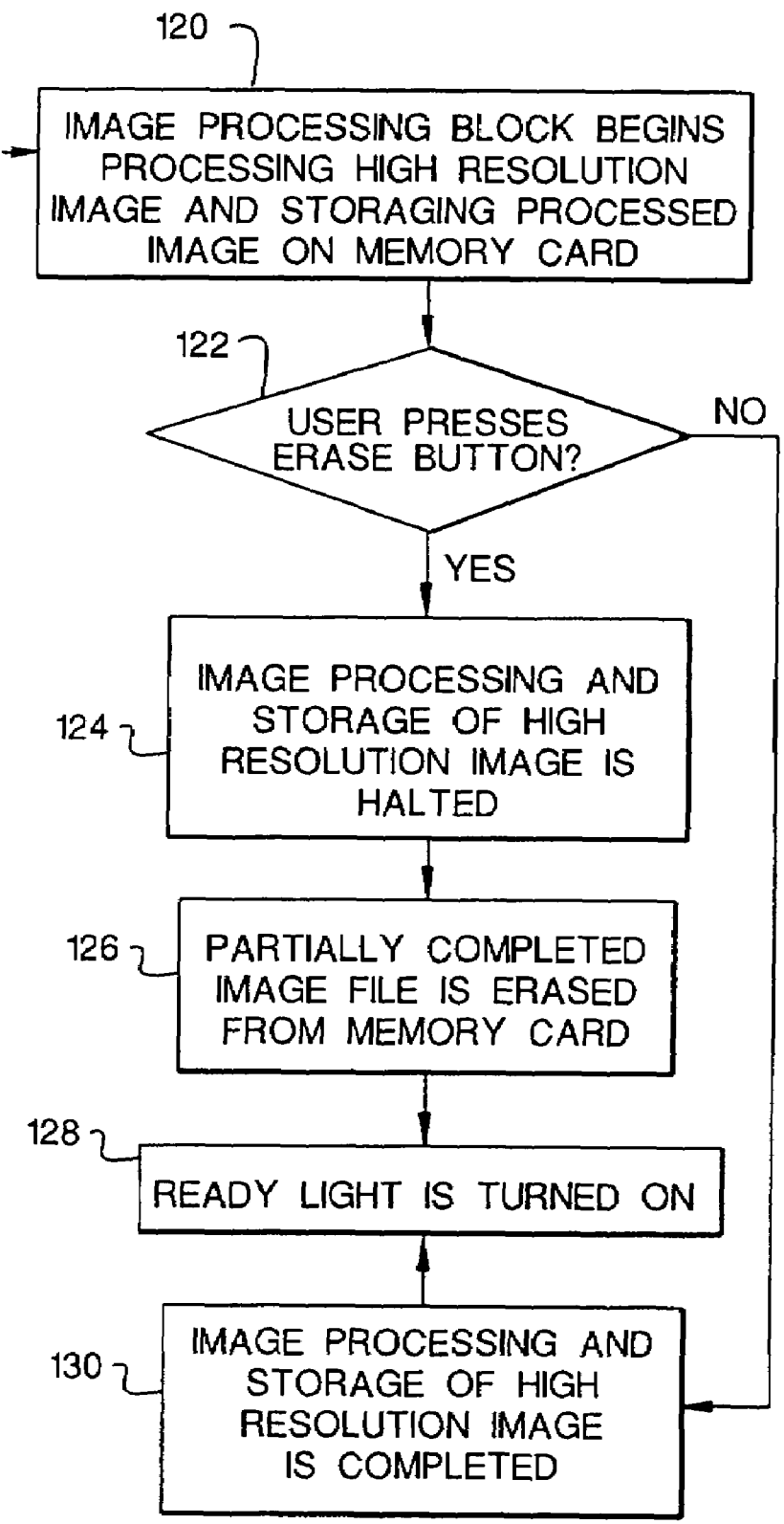

A flow diagram of the steps involved in a typical picture-taking situation is shown in FIG. 3, and will be referenced in connection with the following operational description of the camera. The user turns the camera on by sliding open the viewfinder lens cover 63 (step 100 of FIG. 3), which enables a hidden power switch (not shown). When the camera is powered up, the image LCD 30 initially remains off, to save power, and the ready light 40 in the viewfinder 28 is turned on (step 102), indicating to the user that the camera is ready to take a picture. If the auto exposure detector 42 reads a low ambient light condition, the flash 34 is turned on, and the ready light 40 does not light until the flash is sufficiently charged. When the quick view switch 74 is set to its "on" position (step 104), the camera LCD operates in the quick view mode as images are captured.

The user looks through the optical viewfinder 28 to compose the image (step 106), pressing the telephoto or wide angle buttons 62, 64 to set the zoom lens to the desired focal length. Once the picture is composed, the user presses the shutter button 60 (step 108). The camera control processor and timing generator 32 then generates the signals that expose the sensor 14, and clock out the sensor signal. The analog signal from the sensor is processed in the analog signal processor 20, which performs correlated double sampling and A/D conversion, and then stored in the DRAM buffer memory 22 (step 110).

If the quick view mode is enabled (step 112), the image processing block 24 subsamples the high resolution Bayer color filter array image stored in the buffer memory 22 in order to create an image with the proper number of pixels needed for the display on the image LCD 30 (step 114). The subsampled image is then stored back into the buffer memory 22. This processing can be done quickly, typically in less than 1 second. The image LCD 30 is then turned on, and the image is retrieved from the buffer 22 and displayed on the screen of the image LCD 30 for a predetermined period of time. This predetermined period of time may be a set period of time, for example 3 seconds (step 116), a period of time adjustable by the user, or a period of time that corresponds to the processing time in the image processing block 24. In the latter case, the predetermined period of time may vary somewhat depending on the extent of processing that occurs. This allows the user to review the image, to see if it is acceptable. After the preset time, the image LCD 30 is turned off, in order to minimize the battery drain (step 118). (Alternatively, if battery drain is not of major concern, the image LCD 30 may stay on until the quick view switch 74 is again pressed—perhaps with backup auto turnoff after, say, 10 seconds.)

Once the LCD size image is stored in the buffer memory 22 (step 114), the image processing block 24 begins processing the full resolution Bayer image (step 120). This processing includes, for example, color filter array interpolation, white balance, color correction, edge enhancement, image compression, and file formatting. The resulting image file is stored on the removable memory card 18 in a standard image file format, such as the JPEG interchange format (JIF) described in ISO/IEC 10918-1:1994. A typical JPEG compression algorithm is the Discrete Cosine Transform (DCT). Depending on the size of the sensor 14 and the amount of detail in the scene, this processing may take 5 to 10 seconds to complete. Based on the image displayed on the image LCD 30, the user may decide that the picture just taken is unacceptable, for example if the framing was not good, or if the subject of the picture was not smiling. Rather than wait for the image to be completely processed and stored, the user can press the erase button 76 (step 122). This immediately halts the image processing (step 124), and causes the partially completed JIF file to be deleted from the memory card 18 (step 126). The ready light is then illuminated, indicating that the camera is immediately ready to take the next picture (step 128). If the erase button is not pressed, the image processing is completed as normal (step 130).

As mentioned above, the camera provides the image LCD 30 with three controls: the quick view switch 74, the erase button 76, and the display button 78. When the display button 78 is pushed, the screen of the image LCD 30 displays the last image stored on the removable memory card 18. The image LCD 30 can be turned off by pressing the display button 78 a second time. In the image review mode, the zoom buttons 62,64 are additionally used to cycle through the images stored on the card in forwards or backward order. An image may be erased from the card by using the erase button 76. The erase button 76 is positioned at a level below the camera case, to reduce the chance of accidental erasures.

The invention has been described with reference to a preferred embodiment. However, it will be appreciated that variations and modifications can be effected by a person of ordinary skill in the art without departing from the scope of the invention. For example, while the preferred embodiment shows a switch for enabling the quick view feature, the camera may be designed such that the feature is always enabled and therefore always provides a timed replay of the just-captured image. Moreover, the invention can also be applied to a motion sequence capture device, e.g., the burst capture mode of a still camera, where the quick view feature would entail replay of one or more images in the burst sequence.

PARTS LIST 10 digital camera
12 zoom lens section
14 image sensor
16 processing section
18 removable output memory
20 analog signal processor and A/D converter
22 DRAM buffer memory
24 image processing section
26 interface
28 zooming optical viewfinder
30 image LCD
31 control section
32 control processor and timing generator
34 flash unit
36 status LCD
38 user controls
40 ready light
42 autofocus and autoexposure detectors
44 zoom and focus motors
46 clock drivers
48 power management controller
50 batteries
52 capture power enable line
54 process power enable line
56 LCD drivers
58 LCD backlight
60 shutter button
62 telephoto button
63 viewfinder cover
64 wide angle button
65 autofocus sensors
66 flip up section
68 TAB button
70 select button
72 enter button
74 quick view switch
76 erase button
78 display button
80 cover
82 card slot
84 card eject button
86 LCD brightness wheel
88 handle

What is claimed is:

1. An electronic still camera for capturing and displaying images, said camera comprising:
   a shutter button for initiating capture of the images;
   a sensor for capturing the images;
   a first memory for storing a captured image;
   an electronic image display is automatically powered up after the image is captured by the sensor for automatically displaying the captured images from the first memory for a first time interval in response to operation of said shutter button;
   a second memory for storing a plurality of processed images;
   a processor for processing images from the first memory and storing the processed images as image files in the second memory, said processor operating over a second time interval to process an image;

a user enabled control section coupled to the processor for erasing the image before the end of the second time interval so as to facilitate the capture and processing of another image;

the camera also includes an image display control section to enable the image display to be automatically turned off after displaying the captured image for the first time interval; and wherein the captured image stored in the first memory is subsampled and stored in the first memory prior to the electronic image display being powered up.

2. The camera as claimed in claim 1 wherein the processor responds to the erase command by terminating the processing and deleting a partially completed image file from the second memory.

* * * * *